United States Patent
Billings et al.

(10) Patent No.: US 6,223,303 B1
(45) Date of Patent: Apr. 24, 2001

(54) DISK DRIVE HAVING TWO TIERED DEFECT LIST COMPRISING MARGINAL AND RESERVED DATA SECTORS

(75) Inventors: Russell A. Billings; Kim Edward Russell, both of Rochester, MN (US)

(73) Assignee: Western Digital Corporation, Lake Forest, CA (US)

( * ) Notice: Subject to any disclaimer, the term of this patent is extended or adjusted under 35 U.S.C. 154(b) by 0 days.

(21) Appl. No.: 09/106,830

(22) Filed: Jun. 29, 1998

(51) Int. Cl.$^7$ .................................................. G06F 11/20

(52) U.S. Cl. .................................... 714/8; 714/54

(58) Field of Search ........................... 714/8, 54, 7, 710, 714/719, 5, 42, 48

(56) References Cited

U.S. PATENT DOCUMENTS

| | | | |
|---|---|---|---|
| 5,075,804 | * 12/1991 | Deyring | 360/49 |
| 5,367,652 | * 11/1994 | Golden et al. | 395/499 |
| 5,646,923 | 7/1997 | Shea . | |
| 5,822,142 | * 10/1998 | Hicken | 360/53 |
| 6,025,966 | * 2/2000 | Nemazie et al. | 360/53 |
| 6,154,858 | * 11/2000 | Ottesen et al. | 714/42 |

OTHER PUBLICATIONS

IBM Tech. Disc. Bull., "High–Speed Formatting Operation for a Disk File", vol. 36, iss. 8, pp. 673–674, Aug. 1993.*

\* cited by examiner

Primary Examiner—Robert Beausoleil
Assistant Examiner—Scott Baderman
(74) Attorney, Agent, or Firm—Milad G. Shara (57) ABSTRACT

The present invention provides a method of operating a disk drive having data sites on a disk for recording data thereon. The disk drive is connectable to a host computer and maintains a defect table comprising defective sites reportable to the host computer. The method includes the step of discovering a defective data site on the disk. The defective data site is bounded with a first tier of marginal data sites which are selected based on their proximity to the defective data site. The first tier of marginal data sites is bounded with a second tier of reserved data sites which are selected based on their proximity to the first tier of marginal data sites. The locations of the defective data site, the first tier of marginal data sites and the second tier of reserved data sites are stored in a defect table. The defective data sites and the first tier of marginal data sites are marked as defective sites reportable to the host. A plurality of data sites which are not included within the first tier or second tier of marginal data sites are allocated as spare data sites, while the second tier of data sites are neither allocated as normal data sites, spare data sites nor defective data sites.

17 Claims, 8 Drawing Sheets

DEFECT DISCOVERY TABLE

| MEMORY LOCATION | DATA SITE LOCATION | TIER 2 FLAG |
|---|---|---|
| 0 | D1 | 0 |
| M | D2 | 0 |
| 2M | T1P1 | 0 |
| 3M | T1P2 | 0 |
| 4M | T1P3 | 0 |
| 5M | T1P4 | 0 |
| 6M | T1P5 | 0 |
| 7M | T2P1 | 1 |
| 8M | T2P2 | 1 |
| 9M | T2P3 | 1 |
| 10M | T2P4 | 1 |
| 11M | T2P5 | 1 |
| 12M | T2P6 | 1 |
| 13M | T2P7 | 1 |
| 14M | T2P8 | 1 |

DEFECT MANAGEMENT TABLE

| MEMORY LOCATION | DATA SECTOR LOCATION | TIER 2 FLAG |
|---|---|---|
| 0 | 3, 0, DS2 | 1 |
| N | 3, 0, DS3 | 1 |
| 2N | 3, 0, DS4 | 1 |
| 3N | 3, 0, DS5 | 1 |
| 4N | 4, 0, DS2 | 1 |
| 5N | 4, 0, DS3 | 0 |
| 6N | 4, 0, DS4 | 0 |
| 7N | 4, 0, DS5 | 1 |
| 8N | 5, 0, DS2 | 1 |
| 9N | 5, 0, DS3 | 0 |
| 10N | 5, 0, DS4 | 0 |
| 11N | 5, 0, DS5 | 1 |
| 12N | 6, 0, DS2 | 1 |
| 13N | 6, 0, DS3 | 0 |
| 14N | 6, 0, DS4 | 0 |
| 15N | 6, 0, DS5 | 1 |
| 16N | 7, 0, DS2 | 1 |
| 17N | 7, 0, DS3 | 1 |
| 18N | 7, 0, DS4 | 1 |
| 19N | 7, 0, DS5 | 1 |

DISK DRIVE HAVING TWO TIERED DEFECT LIST COMPRISING MARGINAL AND RESERVED DATA SECTORS

BACKGROUND OF THE INVENTION

1. Field of the Invention

The present invention relates to hard disk drives. More particularly, the present invention relates to a disk drive employing a method of maintaining a two-tiered defect list comprising a first tier of marginal data sites and a second tier of reserved data sites.

2. Description of the Prior Art

Hard disk drives store large volumes of data on one or more disks mounted on a spindle assembly. Disk drives employ a disk control system for interfacing with a host computer to control the reading and writing of data on a disk. Each disk includes up to two disk surfaces which are capable of storing data. On each disk surface, user data is stored in concentric circular tracks between an outside diameter and an inside diameter of the disk. Servo systems are employed to maintain alignment of a transducer head with a desired target data track (termed "track following") for reading and writing user data on the disk surface within desired control parameters.

Embedded servo systems store servo data on the same disk surface as user data to provide control signals and information employed in the operation of the servo system. User data on the disk surface is divided into groups of data sectors. Embedded servo information is recorded in servo sectors placed in radially continuous narrow wedges between the groups of data sectors. In this regard, servo sectors are commonly referred to as "servo wedges". For example, a concentric data track may include 60 equally spaced servo sectors with data regions (i.e., a region containing data sectors, groups of data sectors or partial data sectors) located between adjacent servo sectors.

As a result of the manufacturing process, defective data sites may exist on the disk surfaces of the disk drive. These defective data sites are termed "prior defects". A defect discovery procedure is performed to locate these defects and mark them out as defective locations on the disk surface which are not available for use. Defect discovery for locating defective data sites is performed after the servo sectors have been written on the disk surface. A typical defect discovery procedure includes writing a known data pattern to the disk surface and subsequently reading the data pattern from the disk surface. Defective data sites are identified by comparing the data pattern read from the disk surface with the known data pattern written to the disk surface.

In order to statistically reduce the chances of encountering a defective data site after the manufacturing process (and thereby reducing hard errors reported by the disk drive), disk drive manufacturers commonly pad the defective data sites. The phrase "pad the defective data site" refers to the procedure of marking out data areas which surround or bound the defective data site as also unusable for storing data. Depending on the size of the defective data site, the defective data site may be "padded" both circumferentially and/or radially. For example, a relatively large defective data site may be due to a scratch on the disk surface. The scratch can be circumferentially padded by adding pads to each end of the scratch. The scratch is radially padded by marking off data sites located on tracks in close proximity to the scratch as unusable. If several defective data sites are detected in close linear proximity to each other, a fill procedure is used to pad or "fill in" the areas between the defective data sites. Similarly, if a cluster of defective data sites are found on the disk surface, the cluster of defective data sites are bounded with pads both radially and circumferentially. Alternatively, a very small defective data site may not be padded.

Defective data sites are padded to improve the quality of a disk drive by reducing the number of hard errors reported due to the defective data sites. For example, it is desirable to bound defective data sites with pads because a defect (such as a scratch) might cause marginal error performance in data sites close to the defective data sites even though they were not detected during the defect discovery procedure.

Defective data sites encountered after formatting the disk surface may be termed "grown" defects. Grown defects are also listed in a table. Most grown defects occur in locations adjacent to defective data sites found during defect discovery. Therefore, padding of the defective data sites reduces the number of grown defects encountered after formatting the disk surface, improving the quality of the disk drive and reducing the chances of reporting a "hard error" as a result of the grown defect.

Following the defect discovery procedure, defective data sites and pad locations are put in a prior defect list which is stored in a table. The prior defect list is used during formatting of the disk surface to generate a defect management table. Within the defect management table, the defective data sites and padded locations may be mapped to data sector locations (cylinder number, head number, and data sector number). Once identified in the defect management table, the defective and padded data sectors may not be used for storing data.

The number of sites marked out on a disk drive as "defective data sites" is used as a measure of quality of the disk drive. Upon interrogation by a host, the disk drive will report the defect list generated in the defect management table, the reported defect list including both defective and padded data sectors. However, due to aggressive padding around defective data sites, the defect list can mischaracterize the quality of the disk surface in the disk drive.

U.S. Pat. No. 5,646,923 to Shea (the '923 Patent) discloses selectively "hiding"—i.e. not disclosing to a host computer—the number and locations of marginally defective areas of a disk identified during formatting of the disk surface. According to the '923 patent, a surface analysis test is performed to generate a list of surface defects (prior defect list) to identify locations and size of defective areas on the disk surface. The list of surface defects is used while formatting the disk surface to generate a defect list identifying defective data sectors which are not usable for storing data. The '923 patent relies on using ECC to detect and subsequently correct errors in order to characterize the marginality of a data sector while formatting the disk surface. The ECC correction test can only find data sites which are presenting errors at the time of formatting and cannot completely forecast all sites which may be prone to grown defects later in the life cycle of the disk drive.

It is desirable to aggressively pad (i.e. add more pads around) a defective data site identified in manufacturing during a defect discovery procedure to reduce the chances of a hard error being reported upon later discovery of a grown defect. There is therefore a need to provide a method to conservatively and aggressively pad defective areas in a disk drive while preserving an accurate representation of the disk drive's surface map defect.

SUMMARY OF THE INVENTION

The present invention provides a method of operating a disk drive having data sites on a disk for recording data thereon. The disk drive being connectable to a host computer, wherein the disk drive maintains a defect table comprising defective sites reportable to the host computer. The method includes the step of discovering a defective data site on the disk. The defective data site is bounded with a first tier of marginal data sites which are selected based on their proximity to the defective data site. The first tier of marginal data sites is bounded with a second tier of reserved data sites which are selected based on their proximity to the first tier of marginal data sites. The location of the defective data site, the first tier of marginal data sites and the second tier of reserved data sites are stored in the defect table. The defective data site and the first tier of marginal data sites are marked as defective sites reportable to the host. A plurality of data sites which are not included within first tier of marginal data sites or second tier of reserved data sites are allocated as spare data sites. The second tier of reserved data sites are neither allocated as normal data sites, spare data sites or defective data sites.

The method may further include the step of marking the second tier of reserved data sites as useable for spare data sites. In one aspect, a data site in the second tier of reserved data sites is allocated as a spare data site when the spare data sites are exhausted.

The step of discovering the defective data site includes discovering the defective data site during manufacturing after servo sectors are written on the disk. The step of discovering the defective data site includes the steps of writing a known pattern to the disk; and reading the known pattern from the disk and comparing it to the known pattern written to the disk. The step of bounding the defective data site with a first tier of marginal data sites may include the step of circumferentially bounding the defective data site and/or the step of radially bounding the defective data site. The step of marking the defective data sites and the first tier of marginal data sites as defective sites reportable to the host includes the step of setting a flag in the defect table for the defective data sites and the first tier of marginal data sites.

In another embodiment, the present invention provides a method of operating a disk drive having data sites on a disk surface for recording data thereon, the disk drive being connectable to a host computer. The disk drive maintains a defect table comprising defective sites reportable to the host computer. The method includes the step of discovering a defective data site on the disk surface. The defective data site is bounded with a first tier of marginal data sites which are selected based on their proximity to the defective data site. The first tier of marginal data sites is bounded with a second tier of reserved data sites which are selected based on their proximity to the first tier of marginal data sites. The location of the defective data sites, the first tier of marginal data sites and the second tier of reserved data sites are stored in a defect discovery table.

The method further includes the step of formatting data sectors on the disk surface using the defect discovery table. Preferably, a defect management table is generated from the defect discovery table. A first group of data sectors including the defective data sites and first tier of marginal data sites, and a second group of data sectors is defined including the second tier of reserved data sites. The first group of data sectors is reportable to a host computer, and the second group of data sectors is marked as reserved data sectors.

The method further includes the steps of allocating a plurality of data sites on the disk surface which are not included within first tier of marginal data sites or second tier of reserved data sites spare data sites; and wherein the second tier of reserved data sites are neither allocated as normal data sites, spare data sites or defective data sites. The method may further include the step of marking the second tier of reserved data sites as useable as spare data sites. In one aspect, a data site in the second tier of reserved data sites is allocated as a spare data site when the spare data sites are exhausted.

The method may further include the step of replacing one of the second group of data sectors with a grown defective data sector in the defect management table. In one aspect, the method includes the steps of encountering a grown defective data sector and adding the grown defective sector to the defect management table.

The foregoing and other features of the invention are described in detail below and set forth in the appended claims.

DESCRIPTION OF THE PREFERRED EMBODIMENTS

Figure 1:
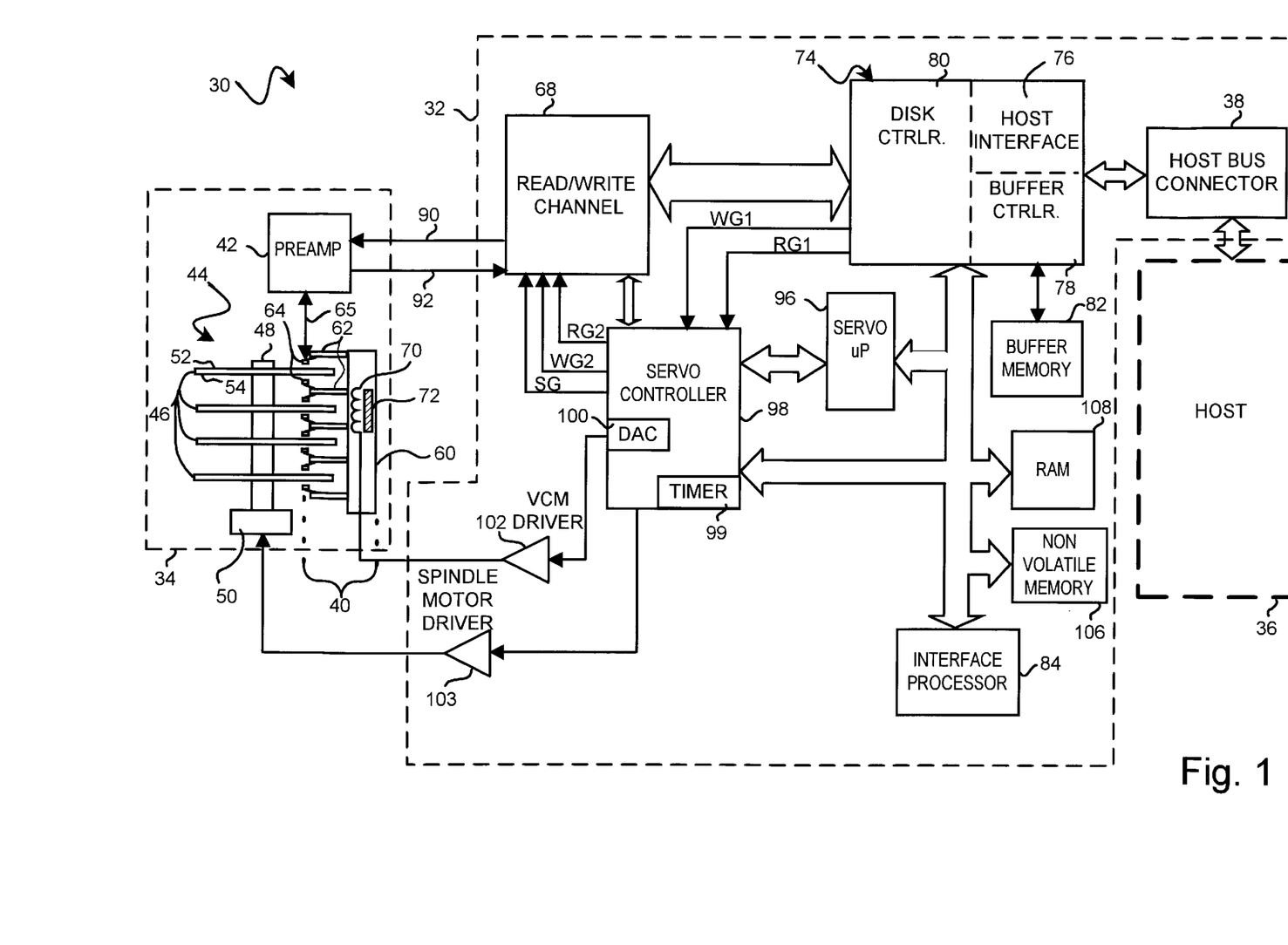
FIG. 1 is a block diagram of a hard disk drive embodying the present invention.

A hard disk drive according to the present invention is illustrated generally at 30 in FIG. 1. Disk drive 30 employs a method of maintaining a two-tiered defect list including a first tier of marginal data sites and a second tier of reserved data sites.

Disk drive 30 includes a disk control system 32 and a head disk assembly (HDA) 34. Disk control system 32 includes circuitry and processors which provide an intelligent disk control system interface between a host system 36 and HDA 34 for execution of read and write commands. Host system 36 can include a microprocessor based data processing system such as a personal computer, or other system capable of performing a sequence of logical operations. Data is transmitted between host system 36 and disk control system 32 via a host bus connector 38.

HDA 34 includes an actuator assembly 40, a preamplifier 42, and a disk assembly 44. Disk assembly 44 includes a plurality of magnetic media disks, such as indicated at 46. Disks 46 are stacked on a spindle assembly 48. Spindle assembly 48 is mechanically coupled to a spindle motor 50 for rotating disks 46 at a high rate of speed. Each disk 46 includes two disk recording surfaces (i.e., disk surfaces) capable of storing data thereon, such as indicated at 52 and 54. The disk surfaces are described in detail further in the specification.

Actuator assembly 40 includes a voice coil motor (VCM) 60 and multiple actuator arms 62 extending from VCM 60. Each actuator arm 62 corresponds to a respective disk surface, such as disk surface 52 and 54. A transducer head 64 is disposed at the end of each actuator arm 62 and each transducer head 64 is associated with a corresponding disk surface 52, 54. Transducer heads 64 communicate with disk control system 32 via preamplifier 42 for reading and writing data to the associated disk surface 52, 54. Preamplifier 42 is electrically coupled to transducer head 64 by connecting means, indicated at 65, for receiving and recording signals which are representative of magnetic transitions on a selected disk surface 52, 54. Preamplifier 42 provides an amplified signal to a read/write channel 68 of disk control system 32. The read/write channel 68 performs a coding and decoding of data written to and read from the disks 46. The read/write channel 68 is described in detail further in the specification.

VCM 60 includes a coil 70 moving in proximity to a permanent magnet 72. Actuator arms 62 are permanently coupled to VCM 60. VCM 60 controllably swings actuator arm 62 and their corresponding transducer heads 64 back and forth over their associated disk surface 52, 54 to access target data tracks formed on the associated disk surface.

Disk control system 32 includes an integrated circuit host interface and disk controller (HDC) 74 having a host interface 76, a buffer controller 78 and a disk controller 80. Host interface 76 communicates with host system 36 via host bus connector 38 by receiving commands and data from and transmitting status and data back to host system 36. Buffer controller 78 controls a buffer memory 82 employed for storing data from host system 36 which is to be written to a disk surface (e.g., disk surface 52). In addition, buffer controller 78 controls buffer memory 82 for storing data read from disk surface 52. Host interface 76 provides for the data to be transmitted to and from the host system. Buffer memory 82 typically comprises random access memory (RAM), such as dynamic random access memory (DRAM). Disk controller 80 sends data to and receives data from read/write channel 68. Disk controller 80 also provides for error correction and error detection on data read from a disk surface.

An interface processor 84 handles the flow of data commands received by host interface 76 by sending commands to and reading status from disk controller 80. Interface processor 84 ascertains which commands to process from host system 36 and when to process these commands, and directs other tasks performed by disk controller 80.

Read/write channel 68 is coupled to preamplifier 42, indicated by read lines 90 and write lines 92. During a read operation, preamplifier 42 amplifies the transition pulses that are detected by a transducer head 64 associated with a disk surface and amplifies them to a signal level that can be processed by read/write channel 68. Read/write channel 68 receives the magnetic transmission pulses read from the disk surface and further amplifies, filters and converts the transition pulses into digital data which is output to disk controller 80. During a write operation, the read/write channel 68 receives data from disk controller 80 and converts the data into pulses for writing data to a disk surface via write lines 92 and preamplifier 42. Preamplifier 42 generates current to drive the transducer head to write transitions on the disk surface.

A servo processor 96 commands a servo controller 98 to control the position of transducer head 64 over disk 46 at a target data track for subsequent execution of read or write commands. Servo processor 96 receives a representative form of a position signal sensed by transducer head 64, via preamplifier 42 and read/write channel 68 and performs calculations to position transducer head 64 relative to its associated disk surface. A digital signal-to-analog converter (DAC) 100 in servo controller 98 responds to digital commands from servo processor 96 to provide a corresponding analog signal to VCM driver 102. VCM driver 102 responds to the analog signal from DAC 100 to provide a corresponding current to VCM 60. The current from VCM driver 102 is provided to coil 70 of VCM 60 and causes movement of actuator assembly 40 which in turn causes the attached actuator arms 62 to swing and thereby move transducer head 64 over an associated disk surface 52, 54 to access target data tracks. Servo processor 96 also provides commands to servo controller 98 to control the rotational velocity of spindle motor 50. Servo processor 98 controls the rotational velocity of spindle motor 50 via servo controller 98 and a spindle motor driver 103 to maintain a substantially constant operational rotational velocity of rotating disks 46.

Disk control system 32 further includes read gate RG1 and write gate WG1 electrically coupled between disk controller 80 and servo controller 98. Read gate RG2 and write gate WG2 are electrically coupled between servo controller 98 and read/write channel 68. Read gates RG1 and RG2 must be asserted for reading of data from a disk surface through read/write channel 68. Similarly, write gates WG1 and WG2 must be asserted before writing of data occurs on a disk surface through read/write channel 68. Servo gate signal SG is enabled when reading servo data from a servo sector located on a disk surface. Also, read gate RG1 or write gate WG1 may be asserted, but servo controller 98 may prohibit the reading or writing of data. For example, when writing data to a disk surface, interface processor 84 may command disk controller 80 to write multiple blocks of data to a data region or series of data sectors on a disk surface, but servo controller 98 may prohibit writing by not enabling write gate WG2 if the transducer head is not on track with the desired target track.

Disk drive control system (including servo system) operational programs are stored in non-volatile memory 106, which may be read-only memory (ROM) or flash memory, and are loaded into RAM 108 for execution. Alternatively, system operational programs may be stored on reserve cylinders on disk 46. Upon startup of hard disk drive 30, disk drive programs, such as the servo system operational programs, are transferred into RAM 108 for fast access by servo processor 96 for positioning transducer head 64 for execution of read and write commands. RAM 108 also includes a defect management table 109 for storing a list of defective data sectors, data sectors including marginal data sites and data sectors including reserve data sites wherein the data sectors including reserve data sites are usable as spare data sectors. Defect management table 109 is discussed in detail later in the specification.

In an exemplary operation of disk drive 30, servo processor 96 receives a command to position actuator assembly 40 for accessing data or writing data on a specific target data track on a disk surface 52 or 54. In operation of disk drive 30, disk controller 80 keeps track of where transducer head 64 is passing over data sectors and servo sectors and servo processor 96 keeps track of which circular data track or "cylinder" of data tracks the transducer head is over, and keeps the transducer head tracking or following on the desired target data track.

The current circular data track position of transducer head 64 is stored in RAM 108 to permit servo processor 96 to determine a required seek distance between the current data track and a target data track on disk 46. Based on the required seek distance, servo processor 96 retrieves a corresponding read or write seek profile from RAM 108 and provides a digital signal command to DAC 100 corresponding to the seek profile. DAC 100 provides a corresponding analog signal to VCM driver 102 representative of the seek profiles. VCM driver 102 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of the servo sectors or "wedges" disposed on disk surface 52 or 54. Based on this position information, a position signal is provided via preamplifier 42, read/write channel 68, and servo controller 98 to servo processor 96 to provide a representative position of transducer head 64 relative to its associated disk surface 52 or 54. Upon completion of a seek operation and the corresponding alignment of transducer head 64 over the target data track, a read or write command is executed to read data from or write to the target data track.

The disk drive 20 includes a disk surface having one or more defective data sites which are locations not useable for storing data. The defective data sites are identified in manufacturing using a defect discovery procedure in accordance with the present invention. The identified defective data sites are aggressively padded using a two-tiered padding procedure whereby the defective data site is bounded with a first tier of marginal data sites which are selected based on their proximity to the defective data site, and wherein the first tier of marginal data sites are bounded with a second tier of reserved data sites which are selected based on their proximity to the first tier of marginal data sites. The defective data sites, the first tier of marginal data sites and the second tier of reserved data sites are maintained in a two-tiered defect list in a defect discovery table.

Prior to formatting, data sites are identified by cylinder number, head and offset from a servo wedge. After the disk is formatted, data sites are translated or mapped to sector addresses. The defect discovery table is used while formatting the disk surface to generate a defect management table identifying the data sectors associated with the defective data sites, and the padded first tier marginal data sites and second tier reserved data sites. The defective data sites and first tier of marginal data sites are reportable to the host 36 as defective data sectors. The reserved data sectors (sites) may be marked as usable for spare data sectors or may be held in reserve against a time when spare sectors are otherwise unavailable. Those sectors which are not included in the defect management table are allocated as normal (suitable for data storage) or spare sectors. The tiered defect discovery and padding procedure in accordance with the present invention is described in greater detail in the following paragraphs.

Figure 2:
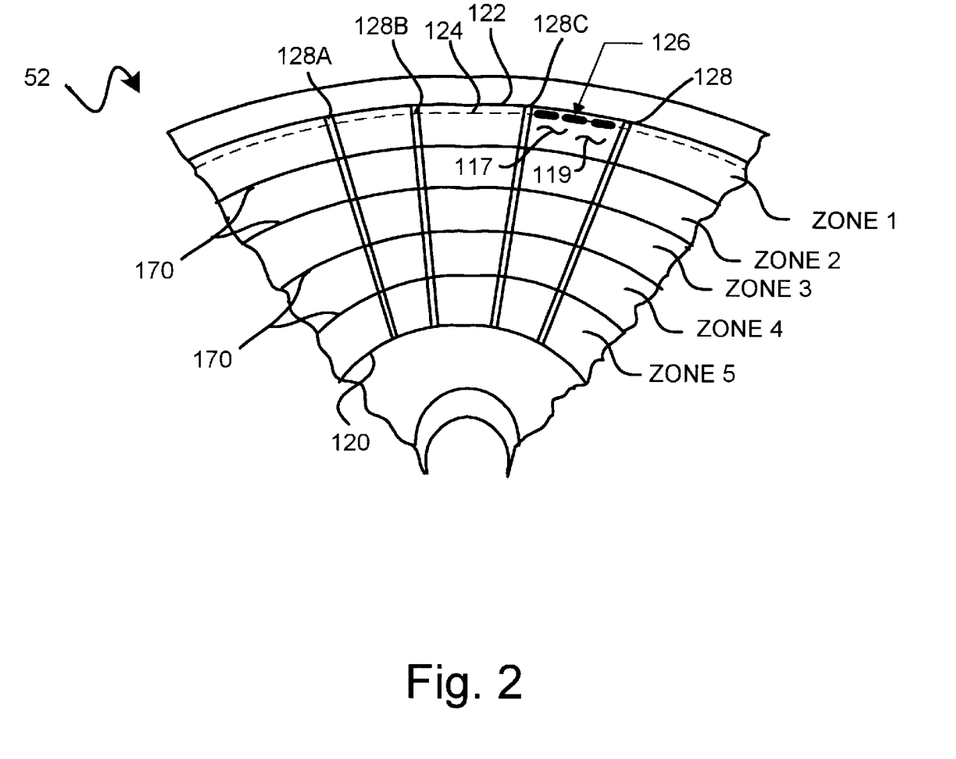
FIG. 2 is a partial plan view of a disk surface having a defective data site which may be encountered during a defect discovery procedure performed during manufacturing of the disk drive of FIG. 1 in accordance with the present invention.

FIG. 2 is a partial plan view illustrating a disk surface having defective data sites. The defective data sites are indicated at 117 and 119. Disk surface 52 includes an inner boundary 120 and an outer boundary 122 defining an annular area suitable for the recording and reproduction of data. Data is stored on concentric tracks, such as indicated by 124, between inner boundary 120 and outer boundary 122. Recorded information (i.e., user data) on the disk surface 52 is divided into regions or groups of data sectors 126. Embedded servo information is recorded in servo sectors or servo "wedges" placed in radially continuous narrow regions (termed "servo sectors") indicated at 128A, 128B, 128C and 128D located between groups of data sectors 126. Servo information is contained in the servo sectors 128 in a number of fields. Such fields may include a field for automatic gain control/phase lock oscillator initialization, a timing information/bit synchronization field (e.g., a servo sync word), a track identification field having the address of the track and servo burst fields for positioning a transducer head over a data track.

Using zone recording techniques, groups of adjacent data tracks are assigned to a plurality of zones between the inner boundary 120 and the outer boundary 122. Disk surface 52 has been partitioned into five physical zones, illustrated by zone boundaries 170, labeled Zone 1, Zone 2, Zone 3, Zone 4 and Zone 5. Disk surface 52 may be partitioned into any desirable, useable number of zones, which more typically, ranges between 10 and 16 zones. The establishment of zones allows for efficiency in recording by varying recording frequencies to maintain approximately constant linear bit density across the disk as well known in the art.

Further, each zone may be divided into one or more designated partitions wherein each partition includes a number of spare data sectors or data tracks. If a disk defect is detected, a defect management scheme (e.g., a push-down or reassignment scheme) can be employed for marking the defective data sector, reallocating the remaining data sectors within the partition and using one of the spare sectors.

After the servo sectors have been written to the disk surface 52, a defect discovery procedure in accordance with the present invention is employed to identify defective data sites on the disk surface 52, and to pad the regions bounding the defective data sites using a two-tiered padding process.

Figure 3:
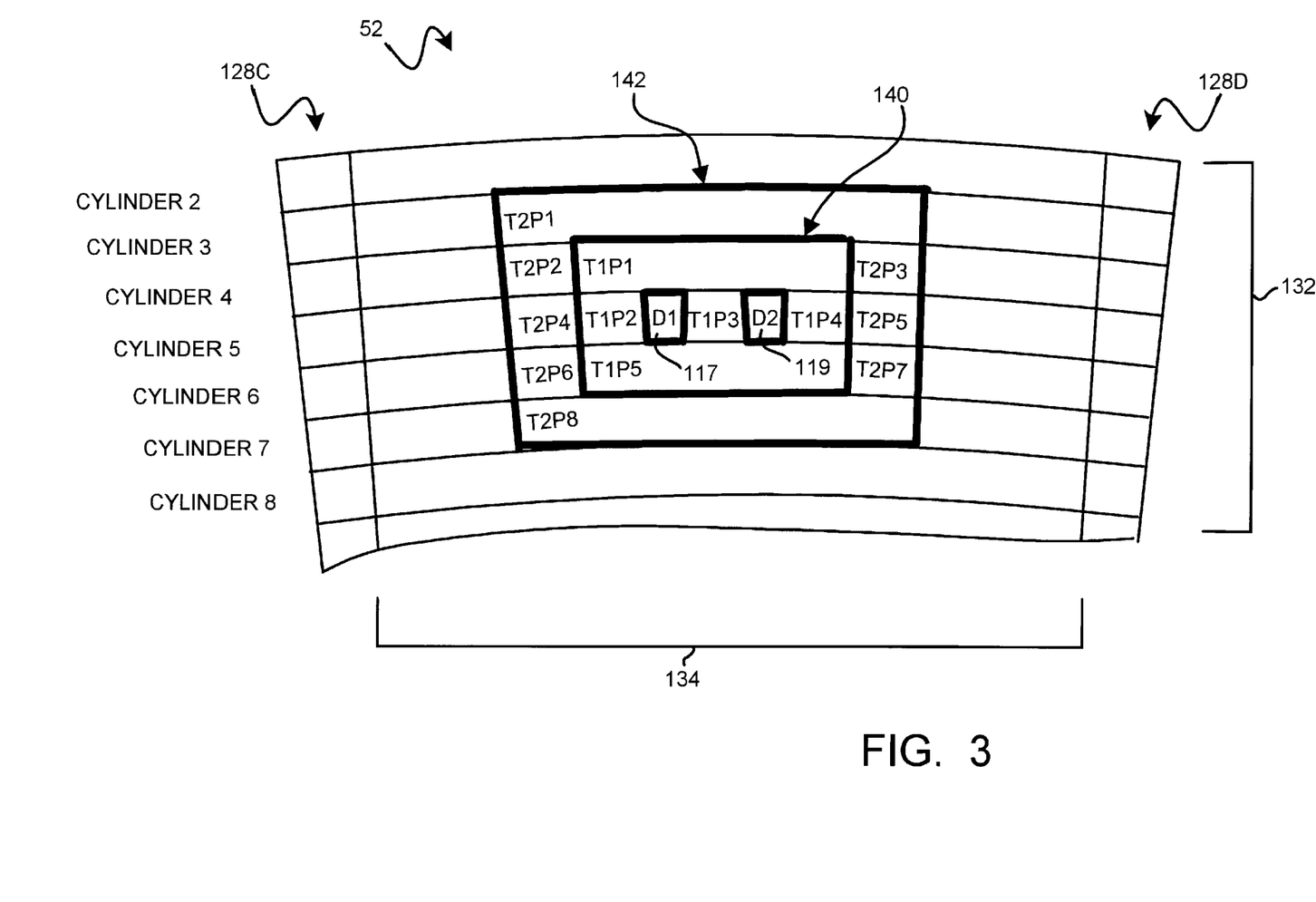
FIG. 3 is a partial plan view of a disk surface having defective data sites, wherein a tier of margin and reserved pads are allocated around the defective data sites.

In FIG. 3, partition 132 is shown representing a portion of Zone 1 shown in FIG. 2. Disk surface 52 is shown during the defect discovery process in manufacturing, after the servo sectors have been written to the disk surface. The portion of partition 132 shown includes cylinder 2, cylinder 3, cylinder 4, cylinder 5, cylinder 6, cylinder 7 and cylinder 8. Disk surface 52 is associated with transducer head 0.

A defect discovery procedure has been performed on the disk surface 52, wherein the defective data sites, and first tier and second tier padded data regions are shown highlighted for purposes of discussion. In particular, partition 132 includes defective data site 117, labeled as D1, and defective data site 119, labeled as D2. Defective data sites 117 and 119 are padded by first tier marginal data sites 140 including data sites T1P1, T1P2, T1P3, T1P4 and T1P5. A second tier of reserved data sites 142 bounds the first tier to provide a more aggressive pad including data sites T2P1, T2P2, T2P3, T2P4, T2P5, T2P6, T2P7 and T2P8.

In one embodiment shown, data region 134 is located between servo sector 128C and servo sector 128D. Suitably, a known (raw) data pattern is written on the disk surface 52 without appending ECC redundant data. The data pattern is subsequently read from the disk surface 52. The data read from the disk is compared to the known pattern to identify defective data sites. In one exemplary embodiment shown, the defective data sites are identified as defective data site D1 117 and defective data site D2 119 respectively. In this example, the relative locations of D1 and D2 form a pattern implying a "scratch" on the disk surface.

Once a defective data site is identified, a two-tiered padding procedure is employed. First, the defective data site D1 and defective data site D2 are bounded by first tier marginal data sites indicated at 140 (closer-in pads). The marginal data sites 140 include circumferential padding of the defective sites D1, D2 with marginal data site T1P2 and marginal data site T1P4. Marginal data site T1P3 is "filled in" between defective data site D1 and defective data site D2 using a pad filling procedure. Defective data site D1 and defective data site D2 are radially padded with marginal data site T1P1 and marginal data site T1P5 on adjacent cylinders. The first tier marginal data sites T1P1, T1P2, T1P3, T1P4 and T1P5 are "high risk" data sites (i.e., high probability of having a grown defect due to their close proximity to defect data site D1 117 and defect data site D2 119), and are not usable as spare data sectors. The first tier marginal data sites are selected based on their proximity to the defective data site. The extent of first tier marginal data sites can be determined experimentally or through characterization of head/media in a class of disk drives.

Next, a second tier of reserved data sites 142 are identified which bound the first tier of marginal data sites 140 (farther away pads). The second tier reserved data sites 142 may be usable as spare data sites, but are held in reserve to statistically improve the quality of the disk drive by further reducing the probability of the occurrence of a hard error. Second tier reserved data sites 142 can both radially and circumferentially bound the first tier of marginal data sites 140, and are identified as second tier reserved data sites T2P1, T2P2, T2P3, T2P4, T2P5, T2P6, T2P7 and T2P8. The second tier reserved data sites are selected based on their proximity to the first tier of marginal data sites. The extent of second tier reserved sites is determined experimentally or through head/media characterization in a class of disk drives.

The defective data sites D1 and D2, the tier one marginal data sites 140, and the tier two reserved data sites 142 are listed in a table. The table may be termed a defect discovery table or prior defect table. The defective, tier one and tier two data sites may be variable in length and identified by head, cylinder, and location of a contiguous bit or byte within a data region, referenced to a servo wedge.

Figure 4:
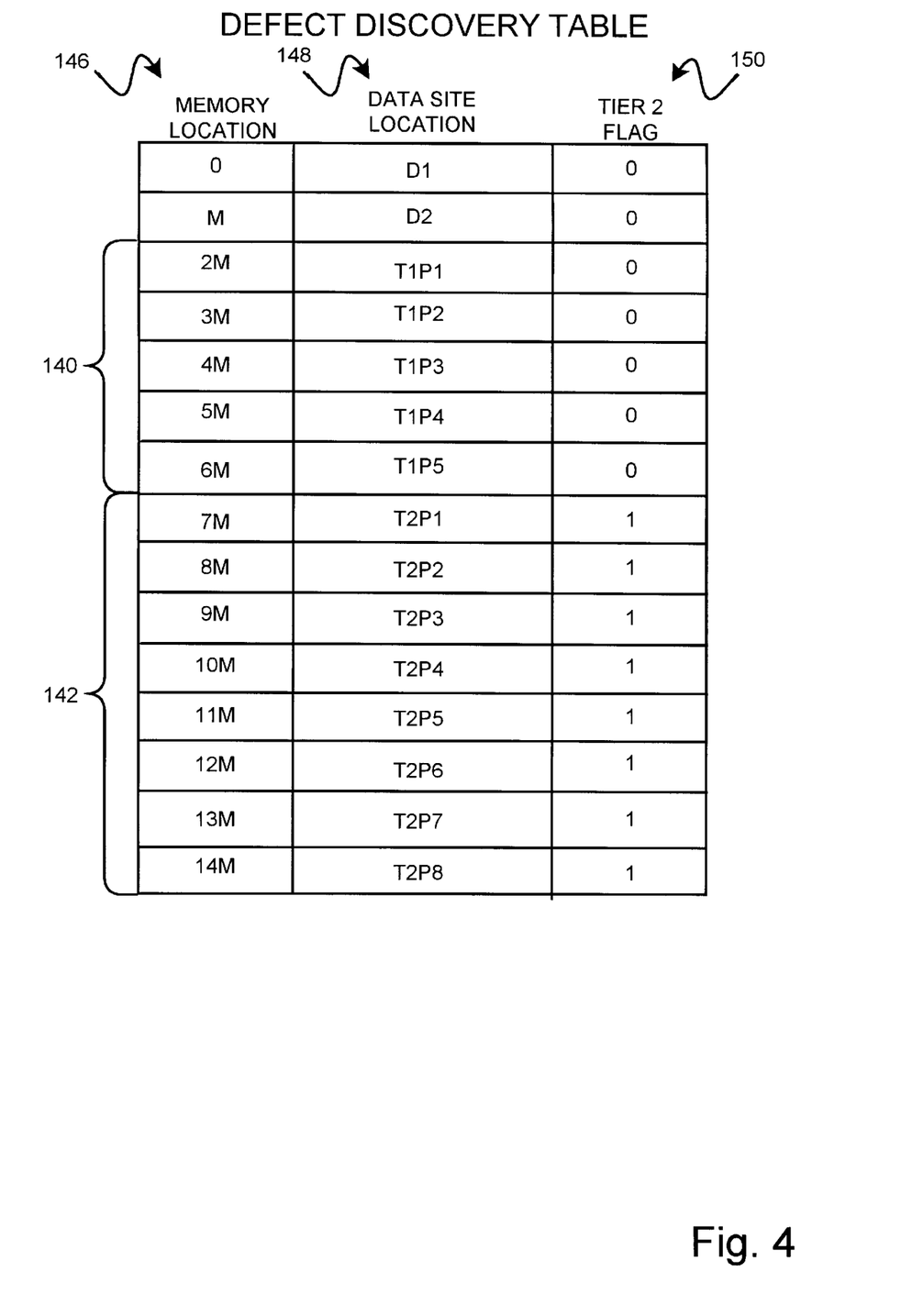
FIG. 4 is a table representative of a defect discovery table in accordance with the present invention.

In FIG. 4, a defect discovery table is shown. Column 146 indicates the relative memory location for each table entry, column 148 indicates the data site location stored at the corresponding memory location, and column 150 is representative of the second tier (tier 2) flag which may be set for each data site. In one embodiment, the information stored at each memory location identifies the data site by cylinder number, head number, servo sector number, data site start byte and length of the identified data site. The flag equals 1 for second tier reserved data sites. The information in the defect discovery table is then used while formatting the disk surface to establish data sector boundaries and to generate a defect management table.

In the exemplary embodiment shown, data site D1 location is stored at memory location zero having a tier2 flag set equal to zero; data site D2 is stored at memory location M (where M is the length in memory locations of an entry) having a tier2 flag equal to zero. Similarly, data site T1P1 is stored at memory location 2M, T2P2 is stored at memory location 3M, T1P3 is stored at memory location 4M, T1P4 is stored at memory location 5M, and T1P5 is stored at memory location 6M. Accordingly, all defective data sites and tier one data sites have the tier 2 flag set equal to zero indicating that they are not suitable for data storage. The tier2 data sites T2P1, T2P2, T2P3, T2P4, T2P5, T2P6, T2P7 and T2P8 are stored respectively at memory locations 7M, 8M, 9M, 10M, 11M, 12M, 13M and 14M. Each second tier data site has the tier 2 flag set, indicating that the sites are reserved, neither used for recording data nor reported as defective sites, nor necessarily allocated for spare sectors.

Figure 5:
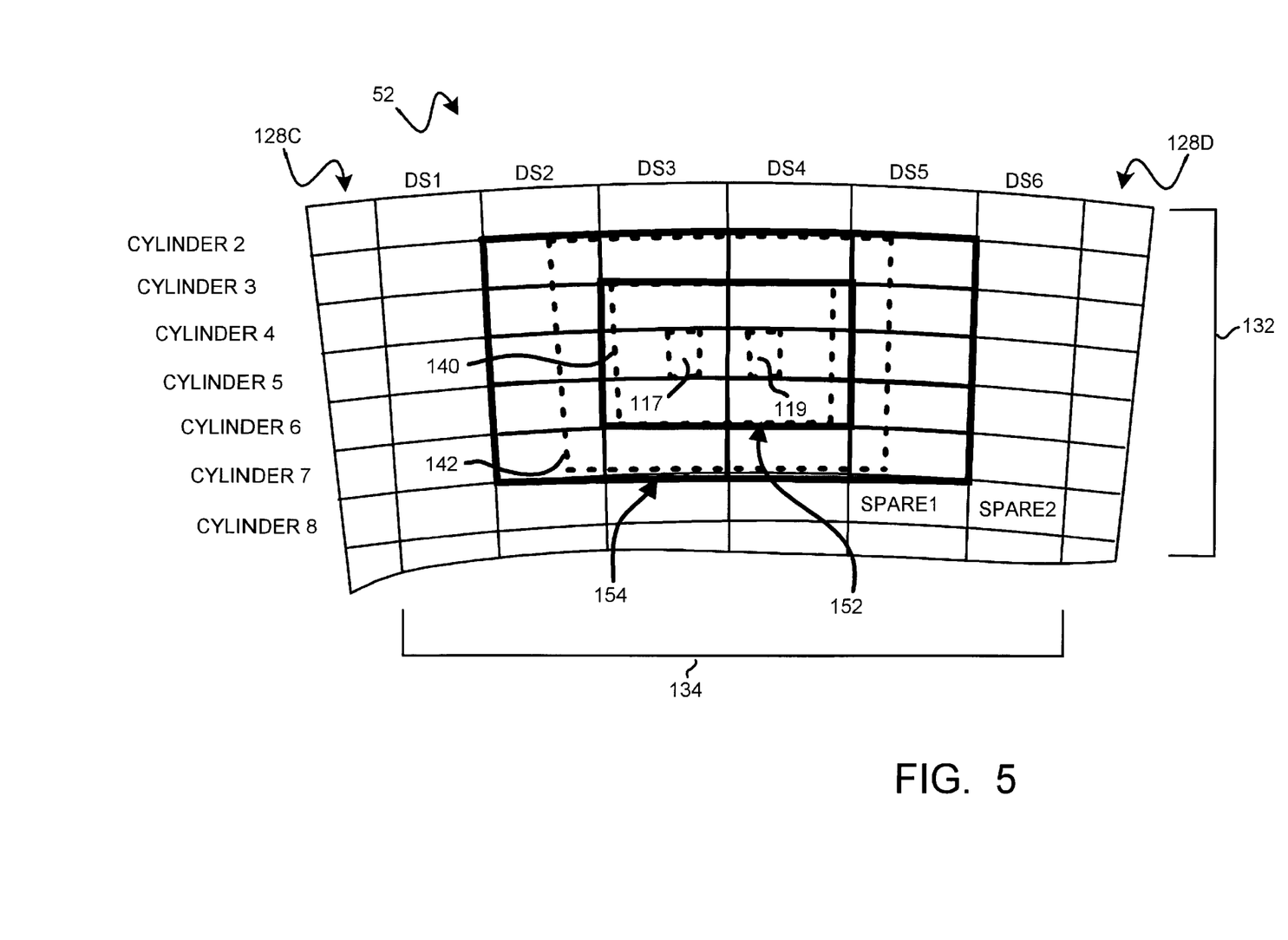
FIG. 5 is a partial plan view of the disk surface after formatting showing the relationship of the defective data sites and pad locations to data sector boundaries.

In FIG. 5, a portion of disk surface 52, partition 132 is illustrated after formatting. The defect discovery table is used in formatting the disk surface 52, including identifying defective data sites on the disk surface. In one embodiment shown, physical data sectors are shown as rectangular segments disposed in each cylinder 2–8. Six data sectors are formatted between servo sector 128C and servo sector 128D for each cylinder, indicated as DS1, DS2, DS3, DS4, DS5 and DS5. Dashed lines 140 show the first tier marginal data sites selected during the defect discovery procedure to bound defective data sites 117 and 119. Solid bold line 152 outlines data sector boundaries encompassing the first tier marginal data sites. Dashed lines 142 show the second tier reserved data sites selected during the defect discovery procedure to bound the first tier marginal data sites. Solid bold line 154 outlines data sector boundaries encompassing the second tier reserved data sites.

Also shown in partition 132 are data sectors SPARE1 and SPARE2, part of a pool of spare sectors which have been allocated as spare data sectors available for use as part of a defect management scheme, such as a push-down scheme or reassign scheme as known in the art.

Figure 6:
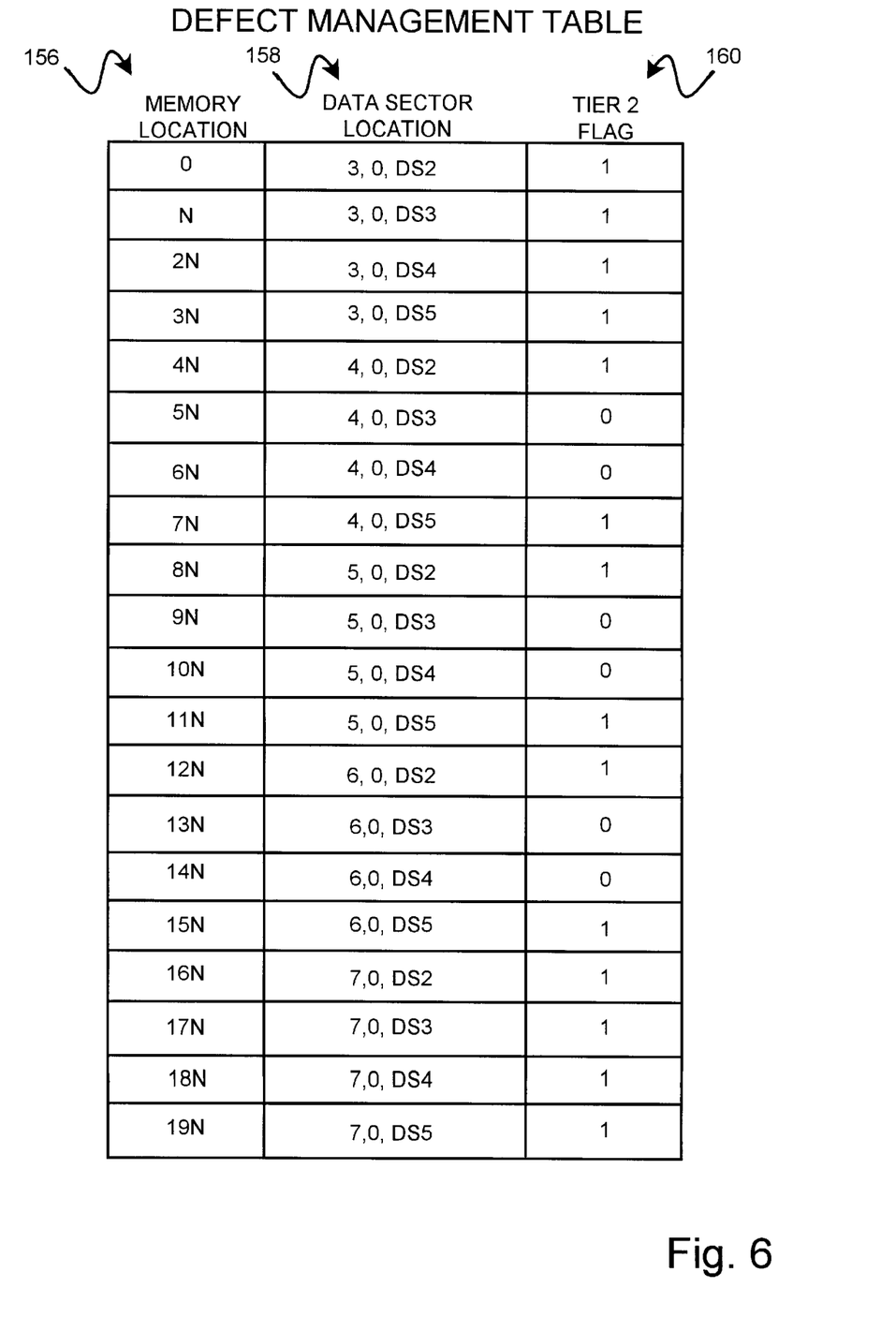
FIG. 6 is a defect management table in accordance with the present invention illustrating a method of storing defective data sites in a table and characterizing data sites to be within a first or second tier of data sites.

FIG. 6 represents a defect management table generated from the defect discovery table used in formatting the disk surface 52 and used for subsequent reading and writing on the disk surface. Column 156 represents the memory location where information is stored for each defective, marginal, or reserved data sector. Column 158 represents the data sector location (cylinder number, head number, data sector number) stored in the table to record the location of each listed data sector. Column 160 represents the flag for second tier (tier 2) reserved data sites. The tier2 flag identified in the defect discovery table has been mapped over to the defect management table to identify data sectors associated with the second tier reserved data sites. No differentiation is made in the defect management table between the data sectors associated with the defective data sites D1, D2 and the data sectors associated with the first tier marginal data sites (having a tier2 flag set equal to zero). Only the second tier reserved data sites have a tier 2 flag set equal to one indicating that they are reserved and are not to be reported as defective data sites nor used as normal data sectors. In the event of spare sectors being exhausted, the reserved tier2 sites may be used as spares.

In one embodiment, the information for each identified data sector stored at each memory location includes the physical sector address of the data sector (i.e. cylinder number, head number, data sector number).

In the exemplary embodiment shown, the data sector located on cylinder three, head zero, data sector DS2 is stored at memory location zero having tier2 flag equal to one; the data sector located at cylinder three, head zero, data sector DS3 is stored at memory location N (where N is the length in memory locations of an entry) having tier2 flag equal to one. Similarly, the remaining data sector locations are stored at memory locations 3N–19N and have a tier2 flag equal to zero or one. Data sector locations having a tier2 flag equal to zero are defective data sectors that encompass defective data sites or first tier marginal data sectors that encompass first tier marginal data sites. Data sector locations having a tier2 flag equal to one are second tier reserved data sectors that encompass second tier reserved data sites.

By aggressively padding during the defect discovery process using a two-tier defect padding procedure, the probability of hard errors reported due to grown defects may be greatly reduced. Further, if a grown defect is encountered after formatting of the disk drive, spares are located within each partition for using a defect management scheme, such as a push-down scheme or reassign scheme as known in the art. The grown defect information is then added to the defect management table, and the disk drive microprocessor will not subsequently allow data to be written at the defective data sector locations. If no more spares exist within a desired partition on the disk surface, or if the defect management table is full a second tier reserved data site may be reclaimed from the defect management table and used as a spare. The vacated defect management table entry is replaced with the grown defective data sector information, and the second tier flag is set to zero.

Upon interrogation by host 36, only the data sectors associated with the defective data site and the higher risk first tier marginal data sites are reported as defective data sites. Although listed in the defect management table, because the second tier reserved data sites can be usable as spares and are not "high risk" data sites, they are not reported as defective data sites to the host 36.

Figure 7:
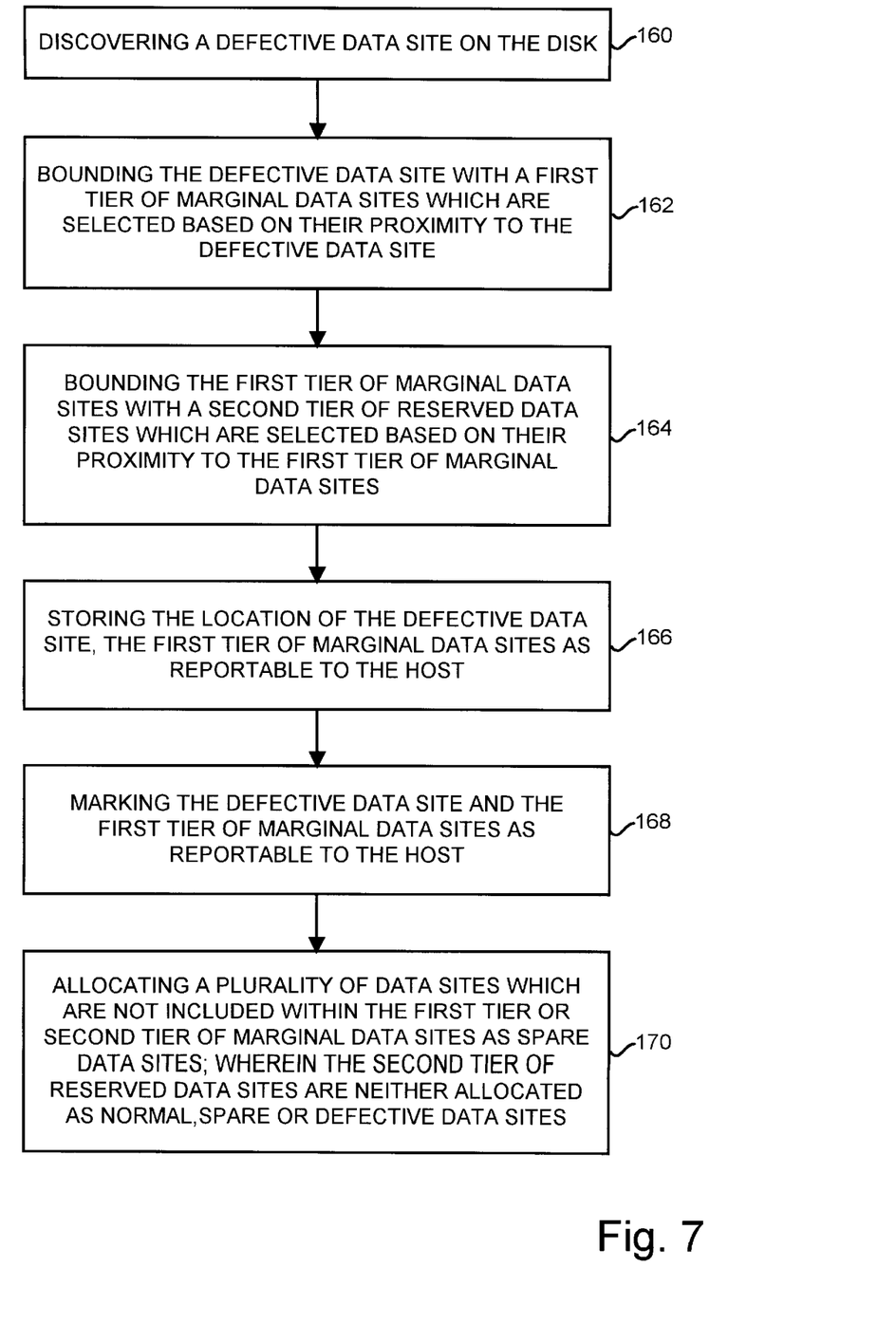
FIG. 7 is a flow chart illustrating a method of operating a disk drive in accordance with the present invention to allocate a first tier of defective data sites as reportable defects and a second tier of reserved data sites which are neither allocated as normal data sites, spare data sites or defective data sites.

FIG. 7 illustrates a flow chart representative of a method of operating a disk drive having data sites on a disk for recording thereon in accordance with the present invention. The disk drive is connectable to a host computer where the disk drive maintains a defect table comprising defective sites reportable to the host computer. In step 160, a defective data site is discovered on the disk. In step 162, the defective data site is bounded with a first tier of marginal data sites which are selected based on their proximity to the defective data site. In step 164, the first tier of marginal data sites are bounded with a second tier of reserved data sites which are selected based on their proximity to the first tier of marginal data sites. In step 166, the locations of the defective data site, the first tier of marginal data sites and the second tier of reserved data sites are stored in the defect table. In step 168, the defective data site and the first tier of marginal data sites are marked as defective sites reportable to the host computer.

In step 170, a plurality of data sites which are not included within the first tier of marginal data sites or second tier of reserved data sites are allocated as spare data sites. The second tier of reserved data sites area neither allocated as normal data sites, spares data sites, nor defective data sites.

The second tier of reserved data sites can be marked as usable for spare data sites. In one aspect, when the normal allocation of spares is exhausted, a data site in the second tier of reserved data sites is allocated as a spare data site.

Figure 8:
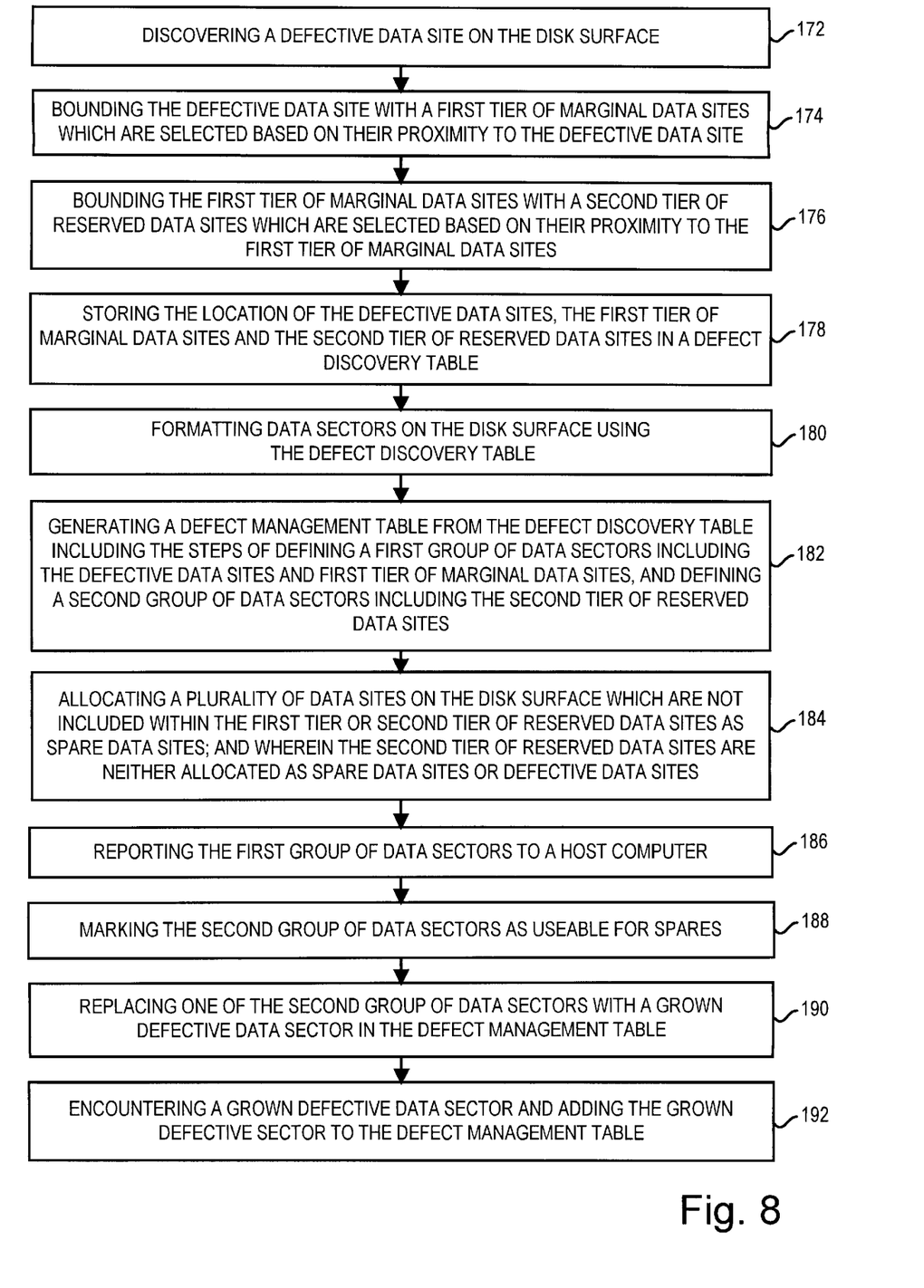
FIG. 8 is a flow chart illustrating an alternative to the method of FIG. 7 wherein the defective, first tier, and second tier of data sites are stored in a defect discovery table that is used while formatting data sectors on the disk surface.

FIG. 8 is a flow chart diagram representing another exemplary embodiment of a method of operating a disk drive in accordance with the present invention. In reference also to FIGS. 1–6, the disk drive 30 includes data sites on a disk surface 52 for recording data thereon. The disk drive 30 is connectable to a host computer 36, wherein the disk drive 30 maintains a defect table comprising defective sites reportable to the host computer. In step 172, a defective data site DS1 is discovered on the disk surface 52 during manufacturing using a defect discovery process. In step 174, the defective data site is bounded with a first tier of marginal data sites 140 which are selected based on their proximity to the defective data site D1. In step 176, the first tier of marginal data sites 140 are bounded with a second tier of reserved data sites 142 which are selected based on their proximity to the first tier of marginal data sites 140. In step 178, the location of the defective data sites D1, D2, the first tier of marginal data sites 140 and the second tier of reserved data sites 142 are stored in a defect discovery table (FIG. 4). In step 180, data sectors are formatted on the disk surface using the defect discovery table.

In step 182, a defect management table (FIG. 6) is generated from the defect discovery table (FIG. 4). The defect management table (FIG. 5) includes defining a first group of data sectors 152 encompassing the defective data sites and first tier of marginal data sites, and defining a second group 154 of data sectors encompassing the second tier of reserved data sites.

In step 184, a plurality of data sites on the disk surface which are not included within the first tier or second tier of data sites are allocated as spare data sites. The second tier of reserved data sites 142 are neither allocated as normal data sites, spare data sites nor defective data sites.

In step 186, the first group of data sectors 152 is reportable to a host computer (36). In step 188, the second group of data sectors 154 can be marked as useable for spare data sectors.

In step 190, one of the data sectors in the second group of data sectors 154 can be replaced with a grown defective data sector in the defect management table. In step 192, the method includes the step of encountering a grown defective data sector and adding the grown defective data sector to the defective management table.

By aggressively padding during the defect discovery process using a two-tiered defect padding procedure as described herein, the probability of hard errors reported due to grown defects is greatly reduced. Further, if a grown defect is encountered after formatting the disk drive, spares are located within each partition for using as part of a defect management scheme, such as a push-down scheme or reassign scheme as known in the art. If no more spares exist within a desired partition on the disk surface, or if the defect management table is full, a data sector including a second tier reserved data site may be reclaimed from the defect management table and used as a spare. The second tier reserved data site can be replaced with the grown defective data sector in the defect management table. On interrogation by the host computer, only the data sectors associated with the defective data site and the higher risk first tier marginal data sites are reported as defective data sites. Although listed in the defective management table, because the second tier reserved data sites can be usable as spares and are not "high risk" data sites, they are not reported as defective data sites to the host computer.

We claim:

1. A method of operating a disk drive having data sites on a disk for recording data thereon, the disk being connectable to a host computer wherein the disk drive maintains a defect table comprising defective sites reportable to the host computer, the method comprising the steps of:

discovering a defective data site on the disk;

bounding the defective data site with a first tier of marginal data sites which are selected based on their proximity to the defective data site;

bounding the first tier of marginal data sites with a second tier of reserved data sites which are selected based on their proximity to the first tier of marginal data sites;

storing the location of the defective data site, the first tier of marginal data sites and the second tier of reserved data sites in the defect table;

marking the defective data site and the first tier of marginal data sites as defective sites reportable to the host;

allocating a plurality of data sites which are not included within the first tier of marginal data sites or second tier of reserved data sites as spare data sites; and wherein the second tier of reserved data sites are neither allocated as normal data sites, spare data sites, or defective data sites.

2. The method of claim 1, further comprising the step of marking the second tier of reserved data sites as useable for spare data sites.

3. The method of claim 1, wherein a data site in the second tier of reserved data sites is allocated as a spare data site when the spare data sites are exhausted.

4. The method of claim 1, further comprising the step of defining the defective data site as a scratch.

5. The method of claim 1, wherein the step of discovering the defective data site includes the steps of writing data having a known pattern on the disk; reading the data that was written from the disk; and comparing the data read from the disk to the known pattern to identify defective data sites.

6. The method of claim 1, wherein the step of bounding the defective data site with a first tier of marginal data sites includes the step of circumferentially bounding the defective data site.

7. The method of claim 1, wherein the step of bounding the defective data site with a first tier of marginal data sites includes the step of radially bounding the defective data site.

8. The method of claim 1, wherein the step of marking the defective data sites and the first tier of marginal data sites as defective sites reportable to the host includes the step of setting a flag in the defect table for the defective data sites and the first tier of marginal data sites.

9. A method of operating a disk drive having data sites on a disk surface for recording data thereon, the disk drive being connectable to a host computer wherein the disk drive maintains a defect table comprising defective sites reportable to the host computer, the method comprising the steps of:

discovering a defective data site on the disk surface;

bounding the defective data site with a first tier of marginal data sites which are selected based on their proximity to the defective data site;

bounding the first tier of marginal data sites with a second tier of reserved data sites which are selected based on their proximity to the first tier of marginal data sites;

storing the location of the defective data sites, the first tier of marginal data sites and the second tier of reserved data sites in a defect discovery table; and formatting data sectors on the disk surface using the defect discovery table.

10. The method of claim 9, further comprising the step of generating a defect management table from the defect discovery table.

11. The method of claim 10, wherein the step of generating a defect management table from the defect discovery table includes the steps of defining a first group of data sectors including the defective data sites and first tier of marginal data sites, and defining a second group of data sectors including the second tier of reserved data sites.

12. The method of claim 11, further comprising the steps of:

allocating a plurality of data sites on the disk surface which are not included within the first tier of marginal data sites or second tier of reserved data sites as spare data sites; and wherein the second tier of reserved data sites are neither allocated as normal data sites, spare data sites or defective data sites.

13. The method of claim 11, further comprising the step of marking the second tier of reserved data sites as useable for spare data sites.

14. The method of claim 11, wherein a data site in the second tier of reserved data sites is allocated as a spare data site when the spare data sites are exhausted.

15. The method of claim 11, wherein the first group of data sectors is reportable to a host computer, and wherein the second group of data sectors is marked as reserved data sectors.

16. The method of claim 11, further comprising the step of replacing one of the second group of data sectors with a grown defective data sector in the defect management table.

17. The method of claim 11, further comprising the steps of encountering a grown defective data sector and adding the grown defective sector to the defect management table.

* * * * *